United States Patent [19]

Czyryk

[11] 4,134,467
[45] Jan. 16, 1979

[54] LOW PROFILE PLATFORM SCALE
[75] Inventor: Chester S. Czyryk, Silver Lake, Wis.
[73] Assignee: Mangood Corporation, Chicago, Ill.
[21] Appl. No.: 784,038
[22] Filed: Apr. 4, 1977
[51] Int. Cl.² ............................................. G01G 19/02
[52] U.S. Cl. .................................... 177/133; 177/255; 177/260; 177/DIG. 9
[58] Field of Search ............... 177/133, 134, 211, 255, 177/DIG. 9, 260

[56] References Cited
U.S. PATENT DOCUMENTS

| 2,742,278 | 4/1956 | Carleton | 177/255 X |
| 2,962,275 | 11/1960 | Thurston | 177/211 |
| 3,123,166 | 3/1964 | Schellentrager | 177/211 |
| 3,512,595 | 5/1970 | Laimins | 177/211 X |
| 3,741,328 | 6/1973 | Andersson | 177/210 |

Primary Examiner—Joseph W. Hartary
Attorney, Agent, or Firm—Leydig, Voit, Osann, Mayer & Holt, Ltd.

[57] ABSTRACT

A low profile platform scale having a rigid rectangular platform and a base assembly, supporting the platform, adapted to rest on an underlying foundation and having four independent corner pads, each with beam load cells mounted in cantilever fashion on the corner pads, with the load cell elements coupled to the platform in an arrangement where the load on the platform is transmitted to the load cell elements by means of a tension member. The tension member is connected by ball and socket means to both the platform and the load cell element. The corner pads are connected to each other by slightly flexible, inelastic rods arranged beneath and adjacent borders of the platform in a rectangular array, and fastened to adjacent corner pads for fixing the spacing between them. The underlying corner pads operate independently and accommodate locally irregular surfaces causing any one of the corner pads to be slightly tilted without affecting the accuracy of response of the load cell. Tubular steel rods are used to connect adjacent corner pads providing conduits for conductors extending from the load cells to a junction box mounted on one corner of the platform.

7 Claims, 8 Drawing Figures

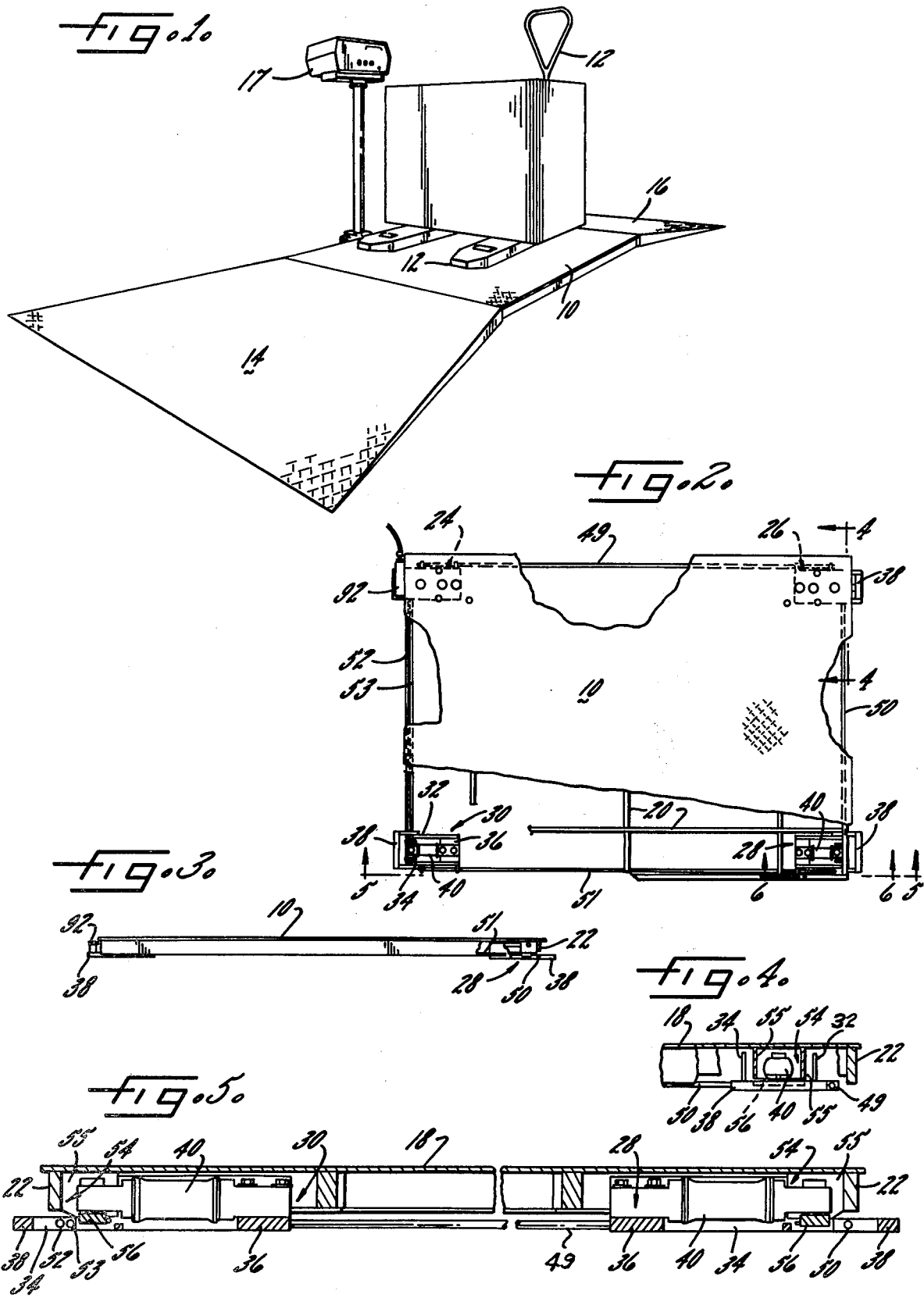

LOW PROFILE PLATFORM SCALE

This invention relates to scales and more particularly low-profile platform scales which are mobile or portable and intended for mounting on a floor without a pit, or in a flush installation requiring a very shallow pit.

The principal object of the invention is to provide low profile scales which have a unitary construction and may be delivered to the user in a fully calibrated and completely assembled form, ready with minimum set-up labor to be placed on a supporting surface and used.

A related object is to provide low profile scales which may be located on slightly uneven supporting surfaces, and will accommodate and adjust to such unevenness without impairing the pre-calibration or affecting the weighing accuracy of the scales.

Another object is to provide platform scales of extremely low profile, which are sufficiently rigid without side rails projecting above the platform to sustain heavy loads, and provide a platform which can be approached from any of the four sides, and due to their low height, with the use of low-inclined ramps enable movement by hand of trucks onto the platform, and with ramps of wide entrance width allow for angular approaches when operating turning radius is limited.

Another object related to the objective to provide platform scales of very low profile is to achieve that objective while structurally shrouding the scale mechanism against damage from load carrying trucks, by having such mechanism located beneath the platform and essentially within its borders, and also providing access to the scale mechanism for leveling adjustment when required to fit the scale for use on significantly uneven foundation surfaces.

How these and other objects are achieved with the present invention will be seen from the following description taken in connection with the accompanying drawings, wherein:

FIG. 1 illustrates a platform scale constructed in accordance with the invention, resting on a flat supporting surface and provided with wide, low inclined entrance ramps, the scale being illustrated as carrying a load supported on a hand truck;

FIG. 2 is a plan view of the platform scale of FIG. 1 without the entrance ramps in place;

FIG. 3 is a side elevational view of the platform scale of FIG. 2;

FIG. 4 is a fragmentary enlarged view with parts broken away showing the corner pad under one corner of the scale platform and is taken as indicated in FIG. 2;

FIG. 5 is an enlarged fragmentary sectional view of the scale platform taken substantially in the plane of line 5—5 of FIG. 2;

Figure 7:
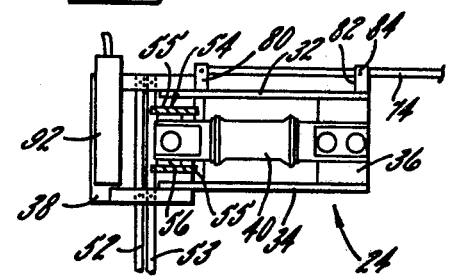
Figure 8:
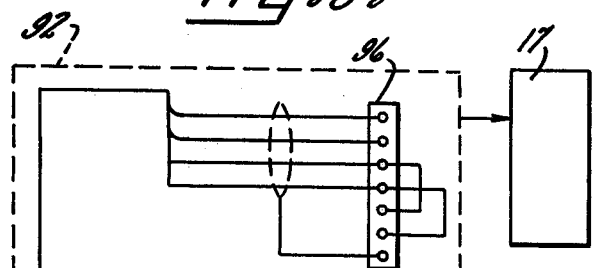

FIG. 7 is an enlarged plan view, with the main plate of the platform removed, of the corner pad underlying the upper left corner of the scale platform as viewed in FIG. 2; and FIG. 8 is a schematic wiring diagram illustrating the connections between the four load cells of the corner pads underlying the corners of the platform and connections to a terminal board within a junction box located on the platform.

Referring to FIG. 1, a platform scale constructed according to the present invention is shown as having a rectangular platform 10 for supporting a load to be weighed, illustratively a carton supported on a hand truck 12, approached from either of two sides by ramps 14, 16. On the side of the platform 10, supported on a stanchion, is a control unit 17 providing control knobs and buttons for operating the scale mechanism and a display for the weight of the load on the platform 10.

The platform 10 is shown with the ramps 14, 16 removed in FIG. 2, and is constructed of a main frame having a steel plate 18 providing the platform surface with longitudinal and transverse reinforcing members 20 and, as shown in FIG. 5, vertical side plates 22 extending along the edges of the platform 10. Preferably, the reinforcing members 20 and side plates 22 are welded to the underside of the main frame plate 18, so as to provide a rigid platform 10, the side plates 22 while having clearance with the foundation surface on which the scale is resting also serving to shroud the supporting mechanism for the platform, all of which is contained essentially within the borders of the rectangular platform itself.

Turning now to FIGS. 2 and 5, it will be seen that the platform 10 is supported by a base assembly which is adapted to rest on the surface of an underlying foundation. The base assembly comprises, in keeping with the invention, four independent corner pads 24, 26, 28, 30, one each under a corner of the rectangular platform 10. In carrying out the invention, the corner pads 24, 26, 28 and 30 are similarly constructed of a pair of spaced side bars 32, 34 (FIGS. 4, 7) rigidly fastened to each other by end bars 36, 38 (FIGS. 4, 5, 6, 7). The four corner pads 24, 26, 28 and 30 carry the platform 10, and provide the sole support therefor. In keeping with the invention, a beam load cell element 40 is mounted in cantilever fashion on each of the corner pads 24, 26, 28, 30. Each load cell element 40 includes an electronic device 42 for providing a weight representing signal responsive to deflections of the load cell element caused by the load on the platform. Each load cell element 40 is mounted on the associated corner pad 24, 26, 28, 30 by means herein shown as mounting bolts 46 fastening one end of the load cell element 40 to an underlying end member 36 of the associated corner pad.

Preferably each load cell element 40 is coupled to the platform 10 by means such that the load on the platform 10 is transmitted to deflect the load cell element 40 and actuate the device 42 without creating cosine forces which act on the load cell element and affect the accuracy of response of the device, even where the underlying corner pad 24, 26, 28, 30 is resting on a locally irregular surface causing it to be slightly tilted. In the present preferred embodiment, such coupling means includes a tension member 48 connected by ball and socket means to both the platform 10 and the load cell element 40. It is also preferred to connect the corner pads 24, 26, 28, 30 to each other by means that allow one or more of the corner pads to accommodate a locally irregular surface and assume a slightly tilted position without affecting the other corner pads or the accuracy of response of the associated load cell element 42. In the present preferred embodiment, such connecting means is provided by slightly flexible, inelastic rods 49, 50, 51, 52, 53 arranged beneath and adjacent borders of the platform 10 in a rectangular array, and fastened to adjacent corner pads for fixing the spacing between them. Tubular steel rods have been found suitable for this purpose.

For transmitting the load on the platform 10 to the underlying load cell elements 40, causing them to deflect and the device 42 to generate weight signals, the free end of each load cell element 40 is coupled to the underside of one corner of the platform. In accordance with the invention, the coupling means comprises an inverted U-shaped hanger 54 (FIGS. 4, 6, 7) with the downwardly extending side legs 55 of the hanger 54 welded to the underside of the main frame plate 18 and the side plate 22, and the hanger providing a cross bar 56, with the load cell element extending substantially horizontally through the hanger 54 above the cross bar 56. The coupling means includes the tension member 48 (FIG. 6) herein shown as a rod threaded at both ends, which extends vertically through both the cross bar 56 and the load cell element 40, the cross bar 56 and load cell element 40 having bores 57, 58 providing clearance with the tension member 48. The spherical ball and socket means connecting the tension member 48 to both the platform 10 and the load cell element 40 include, referring again to FIG. 6, spherical sockets provided by a pair of bearing material inserts 60, 62, preferably made of nylon, which seat in recesses provided by a retainer 63 on the load cell element 40, and the hanger cross bar 56 directly, respectively. Ball nuts 68, 70 which seat in the sockets provided by the inserts 60, 62 are fastened to the ends of the tension member 48, the threads on the tension member being provided for that purpose.

The spherical ball and socket connections between the tension member 48 and both the hanger 54 and the load cell element 40 permit limited relative lateral movement between the platform and the underlying corner pads without transmitting cosine forces axially to the load cell element 40 and affecting the accuracy of the weight representing signals generated by the device 42.

Figure 6:
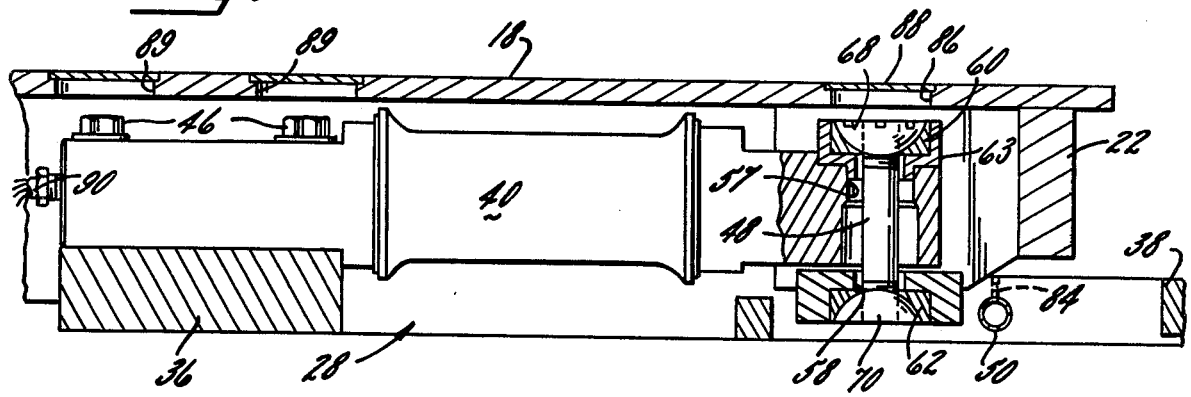
FIG. 6 is an enlarged fragmentary sectional view taken substantially in the plane of line 6—6 in FIG. 2 and illustrating a corner pad underlying one corner of the scale platform.

The rods 49–53 which connect adjacent corner pads, include rods 50, 52, 53 located along the shorter edges of the platform 10 and extending through openings in the interior side bars 34 of the corner pads 24, 26, 28, 30. Along the longer edges of the platform 10, the rods 49, 51 extend through openings in flanges 80, 82 (FIG. 7) projecting laterally from the corner pads. All the rods are fixed at their ends by means of set screws 84 to the side bars 34 or flanges 84, 86 of the corner pads, as the case may be. The spherical ball and socket connections between the tension member 48 and both the load cell element 40 and hanger cross bar 56 provide means for transmitting the load on the platform via the tension members 48 to each of the load cell elements 40 while allowing the underlying corner pads to assume a slightly non-horizontal position without skewing the tension member 48 from a vertical position and producing cosine forces acting axially on the load cell element and affecting weighing accuracy. While any one of the corner pads and its associated load well element 40 may assume a position only a few degrees from horizontal due to local surface irregularities without resulting in significant cosine forces, weighing accuracy is affected when the scale is placed on seriously out-of-level floors. To provide means for leveling the platform 10 and overcoming that problem, provision is also included in the coupling means for adjusting the effective length of each of the tension members 48, access for such adjustment being provided from above the platform. Thus, as shown in FIG. 6, over each tension member 48, a hole 86 is provided in the plate 18, normally closed by a circular insert 88 as shown, through which by means of a screw driver, the ball nut 68 may be turned to adjust the length of the tension member. Furthermore, holes 89 are similarly provided for access through the plate 18 to adjust the mounting bolts 46 securing the opposite end of the lever element to the corner pad.

As previously stated, it is preferred to use tubular steel spacing rods 49–53 for connecting the corner pads 24, 26, 28, 30 to each other. Such rods serve the functions of spacing the corner pads without unduly limiting their desired freedom to adjust to floor irregularities, of retaining the corner pads in a unitary base assembly, and also serve a further function, namely, providing conduits for carrying electrical conductors 90 in a protected manner from the device 42 of the four load cell elements 40 to a junction box 92 shown in FIG. 2 adjacent the upper left-hand corner of the platform 10. To maintain the conductors in separate conduits, side-by-side conduits 52, 53 are included adjacent one shorter edge of the platform 10 to carry a conductor 90 from the diagonally opposite device 42 to the junction box 92 as well as a conductor from the device 42 of the adjacent corner pad 30.

The low overall height of the platform scale is revealed in FIG. 3, and a scale with a 5′ × 7′ platform with a weighing capacity of 9,000 kilograms has been built with an overall height of 8.9 centimeters. This very low overall height is achieved, as seen in FIGS. 4–6, by mounting the main plate 18 with the underside of the plate having a small clearance over the top of the load cell element 40, and with the tension member 48 and ball and socket connection to that load cell element so constructed that it does not extend above the top of the load cell element, as shown. With the side legs 55 of the hanger 54 fastened directly to the underside of the plate 18, the hanger coupling to the platform does not add to the required height.

While the corner pads under the load cell elements 40 jut from beneath the side plate 22 of the platform, the scale mechanism otherwise is entirely beneath and within the borders of the platform. One of the purposes of having the corner pads extend slightly beyond the borders of the platform is to provide access to the corner pads for bolting them to the underlying floor, if desired, to fix the platform scale at a location. While in many cases the platform scale of this invention is used on a floor with entrance ramps as shown in FIG. 1, it is also well suited for mounting a very shallow pit where the top surface of the main plate 18 is flush with the surrounding floor.

As shown in FIG. 8, the conductors 90 extending from the devices 42 through the conduits provided by the spacer rods, lead to the junction box 92 mounted to one corner pad 24 and having contained therein matching resistors 94 where required for the load cells for calibration purposes and a terminal board 96 for connection to the weighing electronics housed in the control unit 17. So constructed, with the devices 42, conductors 90 and junction box 92 in place on the platform scale, the scale may be delivered to a user completely calibrated and tested in association with the weighing instrumentation of the control unit.

I claim as my invention:
1. In a low profile platform scale, the combination comprising:
 a rigid rectangular platform,
 a base assembly for supporting said rectangular platform, and adapted to rest on an underlying surface, said base assembly comprising four independent corner pads, one each under a corner of said rectangular platform, and means connecting each corner pad to corner pads under adjacent corners of said platform, said connecting means including slightly flexible, inelastic rods arranged beneath and adjacent borders of said platform in a rectangular array, and fastened to, for fixing the spacing between, adjacent corner pads while permitting any corner pad to tilt slightly in any direction because the connecting rods bend, and means supporting said platform on said base assembly, comprising a load cell element mounted in cantilever fashion on each corner pad, and means coupling each load cell element to carry a corner of said platform and deflect in response to the load on said platform, each said load cell element including means providing a weight representing signal responsive to deflections of said load cell element, said coupling means including a tension member connected by ball and socket means to means on both said platform and the respective load cell element, means for adjusting the effective length of each of the tension members to level the scale on out of level floors, both said connecting means between corner pads which include connecting rods that bend, and said coupling means between said load cell elements and said platform which include ball and socket couplings that swivel, allow any of said corner pads to accomodate local irregularities in said underlying surface and assume a slightly tilted position without affecting the other corner pads or substantially diminishing the accuracy of response of the associated load cell.

2. In a low profile platform scale, the combination as set forth in claim 1, wherein said means connecting each corner pad to corner pads under adjacent corners of said platform include tubular rods providing conduits, and electrical conductors extending from each said load cell means to a junction box mounted on said platform through said conduits.

3. In a low profile platform scale, the improvements according to claim 1, wherein said ball and socket means of said coupling means comprises ball nuts fastened at each end of said tension member, and bearing material inserts providing spherical sockets for said ball nuts carried by means on the platform and load cells respectively.

4. In a low profile platform scale, the combination comprising:
a rigid rectangular platform,
a base assembly for supporting said rectangular platform, and adapted to rest on an underlying foundation, said base assembly comprising
four independent corner pads, one each under a corner of said rectangular platform, and
means connecting each corner pad to corner pads under adjacent corners of said platform, said connecting means including slightly flexible, inelastic rods arranged beneath and adjacent borders of said platform in a rectangular array, and fastened to, for fixing the spacing between, adjacent corner pads,
means providing the sole support for said platform comprising a load cell element mounted at one end in cantilever fashion on each corner pad, and means coupling the free end of each load cell element to carry a corner of said platform and deflect in response to the load on said platform including a cross bar member fastened to the underside of said platform with said load cell element extending above said cross bar member, a tension member extending vertically through said cross bar member and the free end of said load cell element and having a ball at each end of said tension member, spherical sockets for both said balls provided by bearing material inserts carried by the cross bar members and load cell elements, each said load cell element including means providing a weight representing signal responsive to deflections of said load cell element, said coupling means providing a pivotal connection between said tension member and both said platform and load cell elements, both said connecting means between corner pads and said coupling means between said load cell elements and said platform allowing one or more of said corner pads to accomodate a locally irregular surface and assume a slightly tilted position without affecting the other corner pads or the accuracy of response of the associated load cell element.

5. In a low profile platform scale, the combination as set forth in claim 4, wherein said means connecting each corner pad to corner pads under adjacent corners of said platform include tubular rods providing conduits, and
electrical conductors extending from each said load cell means to a junction box mounted on said platform, through said conduits.

6. A low profile platform scale comprising: a rigid rectangular platform and a base assembly, supporting the platform, adapted to rest on an underlying foundation and having four independent corner pads, beam load cell elements supported in cantilever fashion on the corner pads, coupling means including a tension member between each said load cell element and the platform to transmit the load on the platform to the load cell elements, means connecting said corner pads to each other including slightly flexible, inelastic rods arranged beneath and adjacent borders of the platform in a rectangular array, and fastened to adjacent corner pads for fixing the spacing between them, said underlying corner pads operating independently and being supported by said connecting rods to accommodate locally irregular surfaces causing any one of the corner pads to be slightly tilted, and said coupling means including pivotable connections between said tension member and both said load cell elements and platform for transmitting the platform load to said load cell elements to deflect the latter without affecting the accuracy of response of the load cells, said connecting rods being tubular and providing conduits, and conductors extending from the load cell elements through said conduits to a junction box mounted on one side of said platform.

7. In a low profile platform scale, the combination comprising:
a rigid rectangular platform,
a base assembly for supporting said rectangular platform, and adapted to rest on an underlying surface, said base assembly comprising
four independent corner pads, one each under a corner of said rectangular platform, and
means connecting each corner pad to corner pads under adjacent corners of said platform, said connecting means including slightly flexible, inelastic rods arranged beneath and adjacent borders of said platform in a rectangular array, and fastened to, for fixing the spacing between, adjacent corner pads while permitting any corner pad to tilt slightly in any direction because the connecting rods bend, and means supporting said platform on said base assembly, comprising a load cell element mounted in cantilever fashion on each corner pad, and means coupling each load cell element to carry a corner of said platform and deflect in response to the load on said platform, each said load cell element including means providing a weight representing signal responsive to deflections of said load cell element, said coupling means including a tension member connected by ball and socket means to means on both said platform and the respective load cell element, an inverted U-shaped hanger fastened to the underside of the platform at each corner and providing a cross bar, the respective load cell element being mounted on the respective corner pad so as to extend substantially horizontally through said hanger above said cross bar, and said tension member of said coupling means extending vertically through both said cross bar and said load cell element, means for adjusting the effective length of each of the tension members to level the scale on out of level floors, both said connecting means between corner pads which include connecting rods that bend, and said coupling means between said load cell elements and said platform which include ball and socket couplings that swivel, allow any of said corner pads to accomodate local irregularities in said underlying surface and assume a slightly tilted position without affecting the other corner pads or substantially diminishing the accuracy of response of the associated load cell.

* * * * *